United States Patent
Durand

[15] 3,643,085
[45] Feb. 15, 1972

[54] PHOTOGRAPHIC LIGHT BOX

[72] Inventor: Jacqueline Durand, 600 S. Lathrop Ave., Forest Park, Ill. 60130

[22] Filed: Oct. 13, 1969

[21] Appl. No.: 865,636

[52] U.S. Cl. .................................240/20, 240/46.59
[51] Int. Cl. ...............................F21v 9/00, F21e 5/12
[58] Field of Search.................240/1.3, 46.59, 20, 2, 106; 350/211

[56] References Cited

UNITED STATES PATENTS

| | | | |
|---|---|---|---|
| 1,324,887 | 12/1919 | Folmer | 240/1.3 |
| 1,370,842 | 3/1921 | Reeves | 240/1.3 |
| 1,850,415 | 3/1932 | Robinson | 240/2 |
| 1,988,964 | 1/1935 | Barrows | 350/311 |
| 2,193,518 | 3/1940 | Lubin | 350/311 |
| 2,567,561 | 9/1951 | Hoffman | 240/1 |
| 2,763,772 | 9/1956 | Hine | 240/1.3 |
| 3,007,035 | 10/1961 | DeGroff | 240/1.3 |
| 3,021,422 | 2/1962 | Ogier et al. | 240/1.3 |
| 3,517,180 | 6/1970 | Semotan | 240/1.1 |

Primary Examiner—Richard C. Queisser
Assistant Examiner—John Whalen
Attorney—Max R. Kraus

[57] ABSTRACT

A photographic light box of generally L-shaped configuration having a surface of similar shape, with a curvature between the horizontal and vertical surface portions and with the light distributed in the box to provide a shadowless background for objects to be photographed so that the photograph that is produced has no horizon line.

7 Claims, 5 Drawing Figures

PATENTED FEB 15 1972　　3,643,085

INVENTOR
JACQUELINE DURAND

BY Max R. Kraus
ATTORNEY

PHOTOGRAPHIC LIGHT BOX

BRIEF SUMMARY OF THE INVENTION

One of the objects of this invention is to provide a photographic light box which is lightweight and portable and is used for photographing objects placed on the surface of the light box to produce photographs for catalogs, brochures and/or documentation purposes with a minimum or no retouching necessary and which produces a photograph with a shadowless background wherein the horizon line is eliminated.

Heretofore, with the standard conventional light boxes the photographs produced had shadows and backgrounds in which the horizon line was visible and had to be retouched. With this invention these objectionable features are eliminated and one who is unfamiliar with commercial photographic lighting techniques is able to create an acceptable photograph with practically no retouching necessary. With this invention the diffusion of light is totally uniform over the entire surface of the light box.

Another object of this invention is to provide a light box which is balanced for daylight color films, as well as any type of black and white films. It operates on standard 110-volt household current. The light box which is shown in the preferred embodiment particularly remains cool even when used for prolonged periods of time. The light box is effective for photographing many small objects from all angles by moving the object around the surface of the light box without altering the lighting setup, or altering it only slightly.

Another object of this invention is to provide a light box which is economical to produce and very simple to operate.

Other objects will become apparent as this description progresses.

PREFERRED EMBODIMENT SHOWN IN FIGS. 1 AND 2

Figures 1, 2:
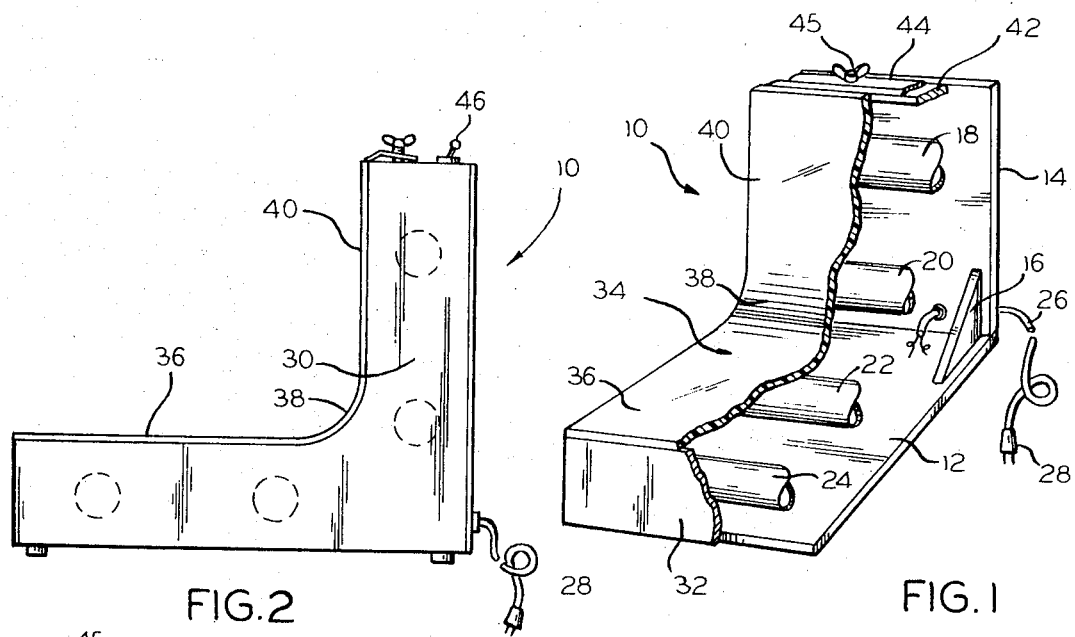
FIG. 1 is a perspective view with a portion broken away to show the interior of the light box and the positioning of the lighting elements.
FIG. 2 is a side elevational view of FIG. 1.

FIGS. 1 and 2 show the preferred embodiment of this invention in which fluorescent light tubes are used. The light box 10 is of generally L-shaped configuration and comprises a base or bottom wall 12 and an upright or rear wall 14 substantially at right angles to the base and secured to said base in any conventional manner. At the corner between the base and the upright and adjacent each of the sides thereof are spaced triangular members 16 suitably secured to both the back and the base. Four fluorescent light tubes 18, 20, 22 and 24 are positioned to extend transversely inside said box. The fluorescent light tube 18 is mounted on the upright wall 14 in a pair of spaced suitable sockets (not shown) adjacent the upper end of the upright rear wall. The fluorescent light tube 20 is mounted on the triangular members 16 on suitable sockets thereto secured. This positions the light tube 20 adjacent the curvature of the surface, as will be described. The fluorescent light tubes 22 and 24 are spacedly mounted and secured in suitable sockets mounted along the bottom wall 12 of the box. It will be seen with respect to the four fluorescent tubes that they are uniformly spaced from each other. The fluorescent light tubes are connected through wiring 26 to a plug 28 which is adapted to be plugged into a wall socket or the like of conventional structure.

The opposite sides 30 of the box are of generally L-shaped configuration and there is a front vertical wall 32. A covering surface 34 made of rigid, translucent glass or plastic is positioned over the open portion of the box to enclose same and said rigid, translucent covering has a horizontal surface 36 which continues as a curved rear surface 38 and continues upwardly as a vertical surface 40. The rigid, translucent glass or plastic covering 34 is substantially of L-shaped configuration with a curved portion 38 between the horizontal and vertical portions 36 and 40 thereof. The upper end of the box at the top of the vertical portion thereof has a cover 42 which has an enlarged opening of generally rectangular-shape which is closed by a rectangular-shaped plate 44 which can hold various kinds of colored background paper to cover the light box surface if a white background is not desired. Suitable thumb nuts 45 secure the plate to the top of the box.

A switch 46 is connected to the conducting wire 26 for controlling the current to the fluorescent light tubes and the switch is positioned at the top of the box. When the plug 28 is inserted into the conventional wall outlet the switch will operate to open and close the circuit to the fluorescent light tubes for the purpose of turning the light on and off. The entire box, except for the translucent glass or plastic covering is opaque.

With the lights on, the object to be photographed is placed on the horizontal surface 36 of the translucent material, even on the curved surface 38 thereof, and is then photographed. By virtue of the shape of the light box and the light, a photograph is produced which is acceptable for catalogs and brochures and requires little or no retouching. A photograph with a shadowless background and without a horizon line is produced. This would not be possible with the conventional light boxes.

The translucent covering or surface may be covered with seamless colored paper (not shown) to provide a variety of colored backgrounds if a color photograph is taken.

It might be expedient in connection with this invention to use a diffuser which is an upright plate member which may be positioned in relation to the light box. Several of such diffusers may be used. Diffusers are well known in the art and forms no part of this invention.

EMBODIMENT SHOWN IN FIGS. 3, 4 AND 5

Figure 4:
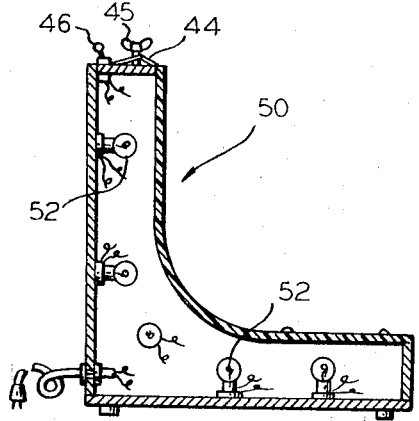
FIG. 4 is a central cross-sectional view of FIG. 3.
Figure 3:
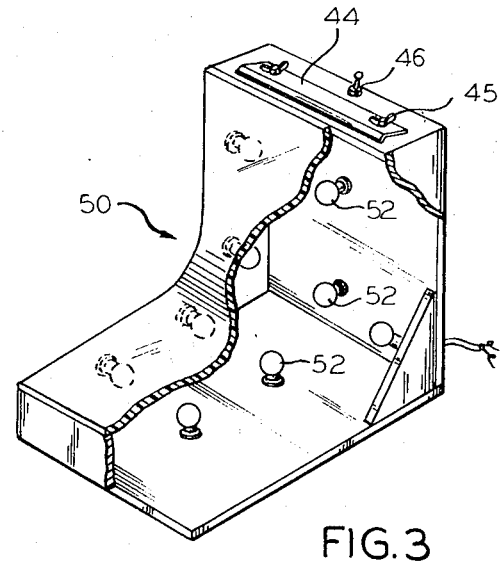
FIG. 3 is a view similar to FIG. 1 but showing the use of incandescent light bulbs in lieu of the fluorescent light tubes of FIGS. 1 and 2.
Figure 5:
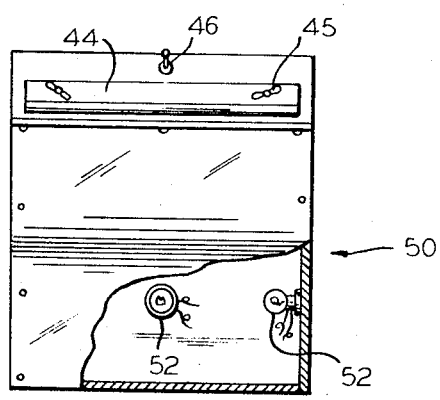
FIG. 5 is a top plan view of FIG. 3.

The light box shown in FIGS. 3, 4 and 5 and generally designated by the numeral 50 is similar to that previously described and hence will not be redescribed. The essential difference between that described in connection with FIGS. 1 and 2 and that of FIGS. 3, 4 and 5 is that instead of using fluorescent light tubes 18, 20, 22 and 24, incandescent light bulbs are secured inside the box in a manner so that they throw substantially the same uniformity of light through the translucent covering as does the fluorescent light tubes. In this modification some of the light bulbs 52 are spacedly mounted on the back upright in standard sockets and some are mounted on the sides adjacent the back and some are spacedly mounted on the base, as well as on the sides adjacent said base. Some of the light bulbs are mounted in an angular position on an angular support positioned between the base and the upright adjacent the curved portion of the covering surface.

Various changes and modifications may be made from the foregoing without departing from the spirit and scope of this invention.

What is claimed is:

1. A photographic light box comprising a horizontal translucent surface and a substantially vertical translucent surface interconnected by a curved translucent surface, a light source behind said surfaces for equally illuminating said translucent surfaces whereby an object placed on said horizontal surface will be photographed with a shadowless background and absence of a horizon line.

2. A light box as set forth in claim 1 in which a light source is positioned directly behind the curved translucent surface.

3. A light box as set forth in claim 1 in which the horizontal, substantially vertical and interconnecting curved surface is an integral surface.

4. A light box as set forth in claim 1 in which the box is of a generally L-shaped configuration.

5. A light box as set forth in claim 1 in which the light source is a plurality of fluorescent light tubes.

6. A light box as set forth in claim 1 in which the light source is a plurality of incandescent light bulbs.

7. A light box as set forth in claim 1 in which the surface is covered with a seamless colored paper to provide a colored background.

* * * * *

UNITED STATES PATENT OFFICE
CERTIFICATE OF CORRECTION

Patent No. 3,643,085          Dated February 15, 1972

Inventor(s) Jacqueline Adams

It is certified that error appears in the above-identified patent and that said Letters Patent are hereby corrected as shown below:

On the cover sheet, [72] the inventor's name and address should read

-- JACQUELINE ADAMS, 1454 Oak Avenue, Evanston, Illinois --

Signed and sealed this 7th day of November 1972.

(SEAL)
Attest:

EDWARD M. FLETCHER, JR.           ROBERT GOTTSCHALK
Attesting Officer           Commissioner of Patents